United States Patent
Kato

(10) Patent No.: US 8,323,597 B2
(45) Date of Patent: Dec. 4, 2012

(54) METHOD FOR PURIFYING EXHAUST GAS CONTAINING MERCURY METAL, OXIDATION CATALYST FOR MERCURY METAL IN EXHAUST GAS AND METHOD FOR PRODUCING THE SAME

(75) Inventor: Yasuyoshi Kato, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 18 days.

(21) Appl. No.: 13/055,521

(22) PCT Filed: Jul. 29, 2009

(86) PCT No.: PCT/JP2009/063465
§ 371 (c)(1),
(2), (4) Date: Mar. 21, 2011

(87) PCT Pub. No.: WO2010/013729
PCT Pub. Date: Feb. 4, 2010

(65) Prior Publication Data
US 2011/0165043 A1 Jul. 7, 2011

(30) Foreign Application Priority Data
Jul. 29, 2008 (JP) ................. 2008-194426

(51) Int. Cl.
B01D 53/64 (2006.01)
B01J 21/06 (2006.01)
B01J 27/14 (2006.01)
B01J 27/187 (2006.01)
B01J 27/198 (2006.01)

(52) U.S. Cl. .............. 423/210; 423/244.09; 423/244.11; 502/220; 502/217; 502/208; 502/209; 502/210; 502/211; 502/350; 502/439

(58) Field of Classification Search ............ 423/210, 423/244.09, 244.1; 502/220, 217, 208, 209, 502/210, 211, 350, 439
See application file for complete search history.

(56) References Cited

U.S. PATENT DOCUMENTS
3,478,063 A * 11/1969 Goehre et al. ............. 549/260
4,152,296 A 5/1979 Okabe et al.
(Continued)

FOREIGN PATENT DOCUMENTS
EP 0 860 197 8/1998
(Continued)

OTHER PUBLICATIONS
Supplementary European Search Report completed Jan. 19, 2012 for Application No. EP 09 80 2971.
(Continued)

Primary Examiner — Timothy Vanoy
(74) Attorney, Agent, or Firm — Fay Sharpe LLP

(57) ABSTRACT

Provided are a catalyst for removing mercury metal, which has high activity for a long time even in an exhaust gas containing $SO_2$, and a method for oxidizing mercury metal using the catalyst. A method for purifying exhaust gas, including bringing an exhaust gas containing mercury metal into contact with a catalyst containing titanium oxide as a first component and a sulfate or phosphate of nickel (Ni), manganese (Mn) or vanadium as a second component, at a temperature of from 100° C. to 200° C., and thereby oxidizing the mercury metal.

19 Claims, 1 Drawing Sheet

U.S. PATENT DOCUMENTS

| | | | |
|---|---|---|---|
| 4,952,548 A * | 8/1990 | Kato et al. | 502/217 |
| 5,707,917 A * | 1/1998 | Geus et al. | 502/209 |
| 6,638,485 B1 | 10/2003 | Iida et al. | |
| 7,842,644 B2 * | 11/2010 | Kai et al. | 502/311 |

FOREIGN PATENT DOCUMENTS

| | | |
|---|---|---|
| JP | 53-116291 | 10/1978 |
| JP | 10-230137 | 9/1998 |
| JP | 2000-189814 | 7/2000 |
| JP | 2003-053142 | 2/2003 |
| JP | 2005-125211 | 5/2005 |
| JP | 2006-205128 | 8/2006 |

OTHER PUBLICATIONS

International Search Report mailed Sep. 1, 2009 for International application No. PCT/JP2009/063465.

Blythe, Gary, et al., Article titled "Mercury Oxidation Catalysts for Enhanced Control by Wet FGD", 2007 Air Quality Conference, Sep. 24-27, 2007.

* cited by examiner

METHOD FOR PURIFYING EXHAUST GAS CONTAINING MERCURY METAL, OXIDATION CATALYST FOR MERCURY METAL IN EXHAUST GAS AND METHOD FOR PRODUCING THE SAME

TECHNICAL FIELD

The present invention relates to a method for purifying an exhaust gas containing mercury metal, and more particularly, to a method for purifying an exhaust gas by oxidizing elemental mercury (Hg) (hereinafter, referred to as mercury metal) contained in a coal exhaust gas at a low temperature of 100° C. to 200° C., an oxidation catalyst for mercury metal in an exhaust gas, and a method for producing the catalyst.

BACKGROUND ART

In recent years, in the United States and Europe, more attention is increasingly paid to the prevention of health problems caused by discharge of various trace components such as mercury (Hg), lead (Pb) and iron (F) that are contained in the flue gas discharged from power plants, various factories and automobiles, in addition to nitrogen oxides (NOx), sulfur oxides (SOx) and the like contained in such flue gas. Thus, there is a movement to impose restrictions to reduce the discharge amount of these components to a very low level. Particularly, mercury discharged from coal-fired boilers is mostly released into the atmosphere in the form of mercury metal having a high vapor pressure, subsequently transformed into organomercury compounds, and ingested into human bodies mainly through fishes and shellfishes, to thereby produce harmful effects on human health. Furthermore, since mercury causes grave harms to the nervous system of growing infants, it has been reported that neurological abnormality cases approximating to 20% of the cases in American infants are suspected of being caused by mercury. As such, since mercury has serious adverse effects on humankind, attempts have been made in various aspects to reduce the discharge amount of mercury.

As a representative method of reducing mercury metal in exhaust gas, there is available a method of reducing NOx in exhaust gas with ammonia ($NH_3$) using a NOx removal catalyst or an improved one thereof, simultaneously oxidizing highly volatile mercury metal into mercury in an oxidized form such as mercury chloride, and subsequently removing the mercury compound in an oxidized form together with combustion ashes or gypsum, using an electrostatic precipitator or a desulfurization apparatus, which is in the downstream area. In this case, a catalyst produced by adding an oxide of vanadium, tungsten or the like as an active component to titanium oxide is used (Patent Document 1).

These catalysts are conventionally used at a temperature of 350° C. to 400° C., which is the same temperature used in NOx removal reactions, in a NOx removal apparatus. However, when there are restrictions in the installation space such as in the case of previously installed boilers, installation of a NOx removal apparatus at the outlet of an electrostatic precipitator (EP) is being considered. Furthermore, since the reaction equilibrium of the oxidation of mercury metal into an oxidized form thereof, $HgCl_2$, is dominant at lower temperatures, as the reaction temperature is lowered, it tends to be easier to obtain a high oxidation ratio. However, in a low temperature treatment of coal combustion exhaust gas containing sulfur dioxide ($SO_2$) in a large amount, there is a problem that the catalyst component is sulfatized, or sulfur trioxide ($SO_3$) which results from oxidation of $SO_2$ is converted to sulfuric acid and accumulates in the catalyst pores, thereby causing the catalyst to be rapidly deteriorated. In order to prevent this, attempts have been made to install the catalyst in the downstream of the desulfurization apparatus, or to regenerate the catalyst by heating (Non-Patent Document 1).

Patent Document 1: Japanese Patent Application Laid-Open No. 2003-53142
Non-Patent Document 1: G. Blysthe, B. Freeman, Bb. Lani, C. Miller, Mercury Oxidation Catalysts for Enhanced Control by Wet FGD, 2007 Air Quality Conference, Sep. 24-27, 2007

DISCLOSURE OF THE INVENTION

Problems to be Solved by the Invention

As described above, when a conventional catalyst is used, and Hg oxidation is carried out at a temperature close to 150° C. at the outlet of an electrostatic precipitator (EP), oxidation products of $SO_2$ cause sulfatization of active components, or sulfuric acid thus generated blocks the catalyst pores, causing rapid deterioration of the catalyst. In regard to these problems, it has been thought that since the deterioration of the latter case is deterioration due to physical phenomena, the problems cannot be avoided only by devising the catalyst component, and the oxidation behavior of $SO_2$ at low temperature is not known sufficiently. Therefore, measures to prevent the deterioration of catalyst have not been sufficiently conceived.

Under such circumstances of the prior art, an object of the present invention is to elucidate the process of the oxidation of $SO_2$ to $SO_3$, and to clarify how the sulfatization of the active components and the deterioration process due to accumulation of sulfuric acid component proceed, and based on these findings, to provide a catalyst for the removal of mercury metal which maintains high activity for a long time even in $SO_2$-containing exhaust gas, and a method for oxidizing mercury metal using the catalyst.

Means for Solving the Problems

In order to achieve the object described above, the inventors of the present invention conducted a detailed investigation on the oxidation behavior of $SO_2$ and the behavior of oxidation products ($SO_3$ and $SO_4$ ions, sulfuric acid, and the like) in the case where an exhaust gas containing $SO_2$ is treated at low temperature, and as a result, they obtained the following findings and completed the present invention based on these findings.

(1) Oxidation of $SO_2$ at low temperature is concentrated not on the oxidation reaction based on oxygen described below (formula 1), but on the reaction with NO of (formula 2). The oxidation reaction of the (formula 1) is dominant at a temperature of 300° C. or higher.

$$SO_2 + 1/2 O_2 \rightarrow SO_3 \qquad \text{(formula 1)}$$

$$2NO + SO_2 \rightarrow N_2O + SO_3 \qquad \text{(formula 2)}$$

(2) Titanium oxide serves as an excellent catalyst for the reaction of (formula 2).

(3) Deterioration of a catalyst due to $SO_2$ is caused by a volume increase concomitant with the sulfatization of the catalyst active component, and blocking of the catalyst pores by the $SO_3$ produced by the reaction of (formula 2) in the form of sulfuric acid or acidic sulfates. When supplied ammonia remains behind in the NOx removal apparatus or EP, $SO_3$ blocks the pores in the form of acidic ammonium sulfate and accelerates deterioration.

The present invention was made based on the findings described above, and the inventions claimed in the present patent application are as follows.

(1) A method for purifying exhaust gas, including bringing an exhaust gas containing sulfur oxides and mercury metal into contact with a catalyst containing titanium oxide as a first component and a sulfate or phosphate of nickel (Ni), manganese (Mn) or vanadium as a second component, at a temperature of from 100° C. to 200° C., and thereby oxidizing the mercury metal.

(2) An oxidation catalyst for mercury metal in exhaust gas, the catalyst containing titanium oxide as a first component, and a sulfate or phosphate of nickel (Ni), manganese (Mn) or vanadium as a second component.

(3) The catalyst as described in item (2), further containing an oxoacid or oxoate of molybdenum (Mo) or tungsten (W) as a third component.

(4) The catalyst as described in item (2) or (3), wherein the maximum hysteretic temperature of the catalyst is 300° C. or lower.

(5) A method for producing an oxidation catalyst for mercury metal, the method including using titanium oxide as a first component and a sulfate or phosphate of nickel (Ni), manganese (Mn) or vanadium as a second component, kneading the first component and the second component at an atomic ratio of 0.03 to 0.3 in the presence of water, subsequently applying the kneading product on a base material to form the kneading product into a plate shape or a honeycomb shape, and drying and calcining the resultant product at a maximum hysteretic temperature of 300° C. or lower.

(6) The method for producing an oxidation catalyst as described in item (5), wherein when the first component and the second component are kneaded, an oxoacid or oxoate of molybdenum (Mo) or tungsten (W) is further added as a third component.

Effects of the Invention (a) According to the present invention, when a sulfate or phosphate which has not been sulfatized is used as a catalyst active component, pore blocking concomitant with a volume increase due to the sulfatization of the catalyst can be prevented.

(b) In regard to the method for producing a catalyst of the present invention, when the maximum thermal hysteretic temperature is limited to 300° C. or lower, the sulfate or phosphate is prevented from reacting with titanium oxide and being decomposed, and the phenomenon in which the sulfate or phosphate is sulfatized during the use stage and the volume increases, can be reduced.

(c) Furthermore, in order to avoid acceleration of the oxidation of $SO_2$ (formula 2) by titanium oxide, the surface of titanium oxide was covered by adding a compound containing oxoacid ions of Mo or W, which is prone to be adsorbed to titanium oxide, in addition the sulfate/phosphate of the active component, and thus the oxidation by the reaction of (formula 2) was suppressed. Thereby, the deterioration phenomenon of an oxidation catalyst for mercury metal caused by $SO_2$, which occurs at low temperature, is significantly reduced, and a catalyst capable of maintaining high activity for a long time could be obtained.

According to the present invention, purification of exhaust gas using an oxidation catalyst for mercury metal, which undergoes the deterioration caused by accumulation of $SO_3$ to a less extent, is made possible, and mercury can be treated under the conditions advantageous for the production of $HgCl_2$ at the outlet of an electrostatic precipitator or the like. Furthermore, in those previously installed boilers which do not have a space for installing a conventional NOx removal catalyst having a Hg oxidation function between an economizer and an air preheater, oxidation of Hg can be conveniently carried out by, for example, installing the catalyst at the outlet of an electrostatic precipitator. In addition, regeneration under increased temperature of a catalyst that has been deteriorated due to $SO_3$, which is needed when a conventional catalyst is used, becomes unnecessary, so that economically great effects can be expected.

BEST MODES FOR CARRYING OUT THE INVENTION

For the catalyst used in the method of the present invention, it is important to use titanium oxide as a first component, and a sulfate or phosphate of nickel (Ni), manganese (Mn) or vanadium as a second component, and in addition to this, it is also important to limit the maximum thermal hysteretic temperature of the catalyst to 300° C. or lower, so that the sulfate or phosphate is not decomposed during the production stage of the catalyst.

In regard to the titanium oxide used here, a titanium oxide having a specific surface area of 50 to 300 $m^2/g$ can be used, but in order to increase the low temperature activity, a titanium oxide having a high specific surface area is likely to give satisfactory results. On the other hand, in regard to the sulfate and phosphate, any salt of the relevant kind can be used, but desirably, a salt which has high solubility in water, dissolves during the catalyst production stage, thereby covering the surface of titanium dioxide, and suppresses the reaction of (formula 2), yields satisfactory results. Furthermore, the salt is not necessarily required to be a salt, a combination of second component compounds that form a sulfate or phosphate as a result of double decomposition during the catalyst production stage, for example, a combination of a nitrate and sulfuric acid, or a combination of an acetate and phosphoric acid may also be used. In this case, in order to maintain the heat treatment temperature at 300° C. or lower, satisfactory results are likely to be obtained if a nitrate or an organic acid salt which evaporates at a temperature equal to or below that heat treatment temperature.

The first component and the second component are kneaded in the presence of water, and if necessary, are kneaded with an added colloidal binding agent such as silica sol or titanium dioxide sol, or an added reinforcing material such as inorganic fiber. Subsequently, the kneading product is formed into a plate shape by applying on a metal or ceramic base material, or into a honeycomb shape using a mold, and then dried and calcined. Regarding the calcination temperature, satisfactory results are obtained when calcination is achieved at 300° C. or lower, and usually at 150° C. to 200° C., for several hours, so as to prevent decomposition of the salts and to avoid sintering of titanium dioxide. The atomic ratio of the second component to the first component used herein is also dependent on the specific surface of titanium dioxide, but is selected to be 0.03 to 0.3. If the amount of addition is too small, not only the activity is lowered, but also the salt covers the surface of $TiO_2$ so that the effect of suppressing the reaction of (formula 2) is decreased, and deterioration is prone to occur. On the other hand, if the amount of addition is too large, the second component causes swelling with hygroscopic moisture. Therefore, when the atomic ratio is preferably selected to be 0.05 to 0.2, satisfactory results are likely to be obtained.

Furthermore, when an oxoacid of W or Mo, or an ammonium salt thereof is used as a third component during the catalyst production stage, titanium oxide adsorbs the oxoacid ions, and thereby the exposure of the titanium dioxide surface, which accelerates the production reaction of $SO_3$, is prevented. Therefore, it is highly effective in the prevention of accumulation of $SO_3$ or sulfuric acid in the pores. The optimal amount of addition is also affected by the specific surface area of titanium oxide and thus cannot be defined definitely, but the amount of addition is in the range of 0.03 to 0.3, and more preferably 0.05 to 0.2, in terms of the atomic ratio with respect to titanium oxide. If the amount of addition is small, the effect is low, and if the amount of addition is large, this leads to an increase in the production cost for the catalyst.

EXAMPLES

FIG. 1 is an explanatory diagram showing the flowchart of an exhaust gas purification method of the present invention. The exhaust gas discharged from a boiler 1 is treated as the exhaust gas passes through a NOx removal apparatus 2, an air preheater 3, an electrostatic precipitator 4 and a desulfurization apparatus 6, and is discharged to the outside of the system through a stack 7. However, the catalyst of the present invention is installed at the outlet of the electrostatic precipitator 4, and mercury metal in the exhaust gas is oxidation treated thereby. FIG. 2 is an explanatory diagram showing that a catalyst reactor 8 holding the catalyst 5 of the present invention is provided between the electrostatic precipitator 4 and the desulfurization apparatus 6 of FIG. 1. In order to perform exhaust gas purification using the catalyst of the present invention, a catalyst installation space is provided at the outlet area of the electrostatic precipitator 4 as shown in FIG. 1, or a catalyst reactor 8 is provided between the electrostatic precipitator 4 and the desulfurization apparatus 6 as shown in FIG. 2, and thereby the catalyst is brought into contact with exhaust gas at a temperature of 200° C. to 100° C. As a result, mercury metal is oxidized and at the same time, reacts with HCl in the exhaust gas, and thereby $HgCl_2$ is formed and is removed at the desulfurization apparatus 6 in the downstream.

Hereinafter, the present invention will be described in detail by way of specific examples.

Example 1

223 g of nickel sulfate ($NiSO_4.6H_2O$) was dissolved in 412 g of silica sol (trade name: o-SOL, manufactured by Nissan Chemical Industries, Ltd.; $SiO_2$ content 20% by weight), subsequently 900 g of titanium oxide (manufactured by Ishihara Sangyo Kaisha, Ltd.; specific surface area 290 m$^2$/g) was added thereto, and then the mixture was mixed by a kneading machine. About 200 g of water was added thereto in the middle of the process to obtain a viscous paste, and then 155 g of an inorganic fiber (kaolin-based, manufactured by Nichias Corp.) was added to obtain a hard paste. This paste was placed on a base material having a thickness of 0.7 mm, which was obtained by subjecting a stainless steel plate made of SUS430 having a thickness of 0.2 mm to metal lath processing, and this was inserted between two sheets of polyethylene sheets. The assembly was passed through a pair of pressing rollers, and the mesh of the metal lath base material was applied so as to be embedded. The plate-shaped catalyst thus obtained was dried at 120° C. and then calcined at 150° C. for 2 hours.

Example 2

A catalyst was obtained in the same manner as in Example 1, except that the nickel sulfate used in Example 1 was replaced with 204 g of manganese sulfate ($MnSO_4.5H_2O$).

Example 3

A catalyst was obtained in the same manner as in Example 1, except that the nickel sulfate used in Example 1 was replaced with 191 g of vanadium sulfate ($VSO_4.xH_2O$, $VOSO_4$ content 72.2%).

Example 4

246 g of nickel acetate ($Ni(NO_3)_2.6H_2O$) and 98 g of 85% phosphoric acid were kneaded together and reacted, and then 422 g of silica sol (trade name: o-SOL, manufactured by Nissan Chemical Industries, Ltd.; $SiO_2$ content 20% by weight) was added thereto to obtain a slurry state. Titanium oxide (trade name: G5, manufactured by Millennium Inorganic Chemicals, Inc.; specific surface area 300 m$^2$/g) was added to this slurry, and the mixture was kneaded while 200 g of water was added. Furthermore, 158 g of inorganic fiber was added thereto, and the mixture was kneaded. This paste was placed on a base material having a thickness of 0.7 mm, which was obtained by subjecting a stainless steel plate made of SUS430 having a thickness of 0.2 mm to metal lath processing, and this was inserted between two sheets of polyethylene sheets. The assembly was passed through a pair of pressing rollers, and the mesh of the metal lath base material was applied so as to be embedded. The plate-shaped catalyst thus obtained was dried at 120° C. and then calcined at 200° C. for 2 hours.

Example 5

A catalyst was produced in the same manner as in Example 4, except that the nickel nitrate used in Example 4 was replaced with 243 g of manganese nitrate ($Mn(NO_3)_2.6H_2O$).

Example 6

A catalyst was produced in the same manner as in Example 4, except that the nickel nitrate used in Example 4 was replaced with a mixture of 77 g of vanadium pentoxide ($V_2O_5$) and 150 g of water.

Examples 7 to 10

A catalyst was obtained in the same manner as in Examples 3 to 6, except that the calcination temperature used for the catalysts was replaced to 300° C. (Example 7), 500° C. (Example 8), 300° C. (Example 9) and 500° C. (Example 10), respectively.

Example 11

A catalyst was produced in the same manner as in Example 3, except that in addition to the addition of vanadium sulfate in Example 3, 121 g of ammonium metatungstate ($WO_3$ content 93%) was added.

Example 12

A catalyst was produced in the same manner as in Example 6, except that in addition to the addition of vanadium pentoxide, 139 g of ammonium molybdate was added and kneaded, and at the same time, the calcination temperature was changed to 300° C.

Comparative Examples 1 and 2

Catalysts composed only of titanium oxide, which was the first component, were produced without adding nickel sulfate to the catalyst of Example 1, and without adding nickel sulfate and phosphoric acid to the catalyst of Example 4.

Comparative Examples 3 to 59

Catalysts were produced in the same manner as in Examples 4 to 6, except that phosphoric acid was not added, and the catalysts were calcined at 500° C. for 2 hours.

Reaction Example 1

The catalysts obtained in Examples 1 to 12 and Comparative Examples 1 to 5 were respectively cut to a strip form having a size of 100 mm×20 mm, and in order to find the rate at which the $SO_3$ produced by the reaction of (formula 1) accumulated in the pores and deteriorated, the amount of production of $N_2O$ generated under the conditions indicated in Table 1 was measured as an index of the rate of deterioration of each catalyst. Furthermore, the Hg oxidation ratio of mercury metal of each catalyst was measured under the conditions indicated in Table 2. The results thus obtained are summarized and presented in Tables 3 and 4.

It was found from Table 3 that the catalysts of the present invention have the amount of production of $N_2O$, that is, the amount of accumulation of $SO_3$ generated in (formula 1), noticeably reduced and have the deterioration at low temperature greatly improved, as compared with the catalysts of the Comparative Examples having a ca'talyst of titanium oxide only and oxides as active components. Furthermore, from the comparison of the Examples and Comparative Examples, it was clarified that the effect of using a sulfate or a phosphate as the active component of the catalyst was large in the range of 100° C. to 200° C. Since the amount of production of $N_2O$ in Examples 11 and 12 was reduced, it was found that the addition of an oxoate of W or Mo is effective in the deterioration.

On the other hand, as shown in Table 4, the oxidation ratio of mercury metal was almost 0% for Comparative Examples 1 and 2, while high values of the oxidation ratios were obtained in all of the Examples. Furthermore, the catalysts exhibit relatively high values as compared with the catalysts having the oxides of Comparative Examples 3 to 5 based on high temperature calcination, as active components. Therefore, it is understood that the catalysts of the present invention are excellent as oxidation catalysts for mercury metal at low temperature.

TABLE 1

| Item | Value |
|---|---|
| 1. Gas composition | |
| NOx | 200 ppm |
| $SO_2$ | 200 ppm |
| $O_2$ | 3% |
| $CO_2$ | 12% |
| $H_2O$ | 12% |
| $N_2$ | Balance |
| 2. Gas flow rate | 3 liters/min |
| 3. Temperature | 110-200° C. |
| 4. Catalyst packing amount | 20 mm width × 100 mm (full length) 3 sheets |

TABLE 2

| Item | Value |
|---|---|
| 2. Gas composition | |
| NOx | 300 ppm |
| NH3 | 300 ppm |
| $SO_2$ | 1000 ppm |
| $O_2$ | 3% |
| $CO_2$ | 12% |
| $H_2O$ | 12% |
| Hg | 10 ng/liters |
| HCl | 30 ppm |
| 2. Gas flow rate | 3 liters/min |
| 3. Temperature | 150° C. |
| 4. Catalyst packing amount | 20 mm width × 100 mm (full length) 3 sheets |

TABLE 3

| | Deterioration index: $N_2O$ production amount (ppm) | | |
|---|---|---|---|
| Catalyst | 110° C. | 150° C. | 200° C. |
| EX. 1 | 24 | 23 | 15 |
| Ex. 2 | 18 | 17 | 13 |
| Ex. 3 | 4 | 3 | 2 |
| Ex. 4 | 23 | — | — |
| Ex. 5 | 22 | — | — |
| Ex. 6 | 3 | — | — |
| Ex. 7 | 5 | 5 | 2 |
| Ex. 8 | 4 | — | — |
| Ex. 9 | 12 | — | — |
| Ex. 10 | 10 | — | — |
| Ex. 11 | 2 | 1 | 0 |
| Ex. 12 | 1 | 0 | 0 |
| Comp. Ex. 1 | 63 | 64 | 43 |
| Comp. Ex. 2 | 76 | 73 | 56 |
| Comp. Ex. 3 | 65 | 67 | 37 |
| Comp. Ex. 4 | 54 | 44 | 22 |
| Comp. Ex. 5 | 38 | 38 | 18 |

TABLE 4

| Catalyst | Hg oxidation ratio (%) |
|---|---|
| EX. 1 | 23 |
| Ex. 2 | 17 |
| Ex. 3 | 55 |
| Ex. 4 | 19 |
| Ex. 5 | 22 |
| Ex. 6 | 57 |
| Ex. 7 | 56 |
| Ex. 8 | 55 |
| Ex. 9 | 47 |
| Ex. 10 | 50 |
| Ex. 11 | 67 |
| Ex. 12 | 72 |
| Comp. Ex. 1 | 1 |
| Comp. Ex. 2 | 0 |

TABLE 4-continued

| Catalyst | Hg oxidation ratio (%) |
|---|---|
| Comp. Ex. 3 | 13 |
| Comp. Ex. 4 | 14 |
| Comp. Ex. 5 | 45 |

EXPLANATION OF REFERENCE NUMERALS

Figure 1:
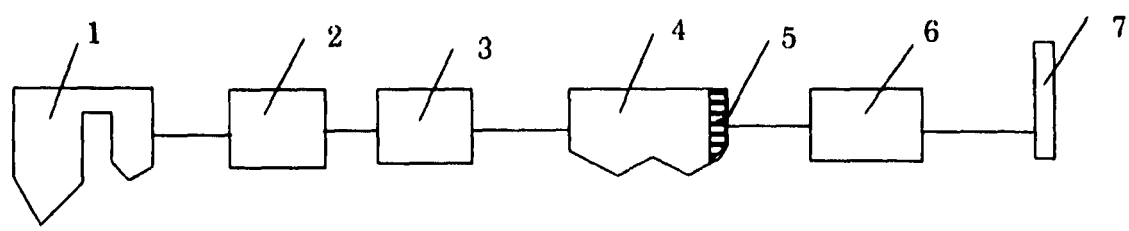
FIG. 1 is an explanatory diagram showing the flowchart of a method for purifying exhaust gas of the present invention.
Figure 2:
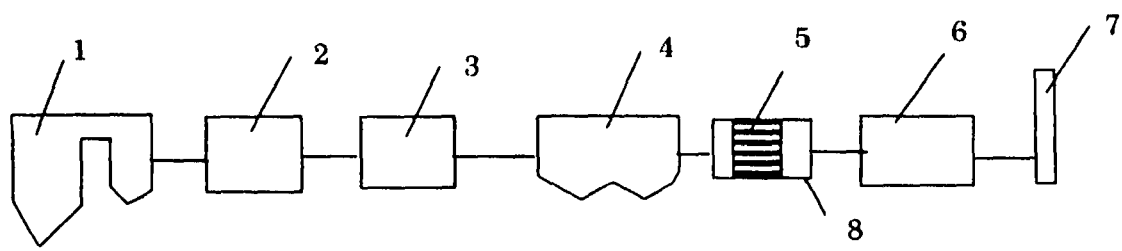
FIG. 2 is an explanatory diagram in which a catalyst reactor holding the catalyst of the present invention is provided between an electrostatic precipitator and a desulfurization apparatus of FIG. 1.

| 1 | BOILER |
|---|---|
| 2 | NOx REMOVAL APPARATUS |
| 3 | AIR PREHEATER |
| 4 | ELECTROSTATIC PRECIPITATOR |
| 5 | CATALYST OF PRESENT INVENTION |
| 6 | DESULFURIZATION APPARATUS |
| 7 | STACK |
| 8 | CATALYST REACTOR |

The invention claimed is:

1. A method for purifying exhaust gas, comprising bringing an exhaust gas containing sulfur oxides and mercury metal into contact with a catalyst containing titanium oxide as a first component and a sulfate or phosphate of nickel (Ni), manganese (Mn) or vanadium as a second component, at a temperature of from 100° C. to 200° C., and thereby oxidizing the mercury metal.

2. An oxidation catalyst for mercury metal in exhaust gas, comprising titanium oxide as a first component and a phosphate of nickel (Ni), manganese (Mn) or vanadium as a second component.

3. The catalyst according to claim 2, further comprising an oxoacid or oxoate of molybdenum (Mo) or tungsten (W) as a third component.

4. The catalyst according to claim 2, wherein the maximum hysteretic temperature of the catalyst is 300° C. or lower.

5. A method for producing an oxidation catalyst for mercury metal, comprising using titanium oxide as a first component and a sulfate or phosphate of nickel (Ni), manganese (Mn) or vanadium as a second component, kneading the first component and the second component at an atomic ratio of the second component to the first component of 0.03 to 0.3 in the presence of water, subsequently applying the kneading product on a base material to form the kneading product into a plate shape or a honeycomb shape, and drying and calcining the resultant product at a maximum hysteretic temperature of 300° C. or lower.

6. The method for producing a catalyst according to claim 5, wherein when the first component and the second component are kneaded, an oxoacid or oxoate of molybdenum (Mo) or tungsten (W) is further added as a third component.

7. The catalyst according to claim 3, wherein the maximum hysteretic temperature of the catalyst is 300° C. or lower.

8. The method according to claim 1, wherein the second component is a sulfate of nickel.

9. The method according to claim 1, wherein the second component is a sulfate of manganese.

10. The method according to claim 1, wherein the second component is a sulfate of vanadium.

11. The method according to claim 1, wherein the second component is a phosphate of nickel.

12. The method according to claim 1, wherein the second component is a phosphate of manganese.

13. The method according to claim 1, wherein the second component is a phosphate of vanadium.

14. The catalyst according to claim 2, wherein the second component is a phosphate of nickel.

15. The catalyst according to claim 2, wherein the second component is a phosphate of manganese.

16. The catalyst according to claim 2, wherein the second component is a phosphate of vanadium.

17. The method of claim 5, wherein the second component is a phosphate of nickel.

18. The method of claim 5, wherein the second component is a phosphate of manganese.

19. The method of claim 5, wherein the second component is a phosphate of vanadium.

* * * * *